US012792456B2

(12) United States Patent
Gohain et al.

(10) Patent No.: US 12,792,456 B2
(45) Date of Patent: Nov. 10, 2026

(54) PANIC HANDLING FOR MEMORY SYSTEMS

(71) Applicant: Micron Technology, Inc., Boise, ID (US)

(72) Inventors: Nitul Gohain, Bangalore (IN); John Maroney, Irvine, CA (US); Brent Carl Byron, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 22 days.

(21) Appl. No.: 19/174,474

(22) Filed: Apr. 9, 2025

(65) Prior Publication Data

US 2025/0328413 A1 Oct. 23, 2025

Related U.S. Application Data

(60) Provisional application No. 63/635,726, filed on Apr. 18, 2024.

(51) Int. Cl.
*G06F 11/07* (2006.01)

(52) U.S. Cl.
CPC ........ *G06F 11/0793* (2013.01); *G06F 11/076* (2013.01); *G06F 11/0775* (2013.01); *G06F 11/079* (2013.01)

(58) Field of Classification Search
CPC ............. G06F 11/0727; G06F 11/0793; G06F 3/0617; G06F 3/0634; G06F 3/0637
See application file for complete search history.

(56) References Cited

U.S. PATENT DOCUMENTS

| | | | | |
|---|---|---|---|---|
| 6,052,804 A * | 4/2000 | Thowe | G11B 20/1883 714/25 |
| 2013/0185587 A1 | 7/2013 | Brown et al. | |
| 2015/0089278 A1* | 3/2015 | Patapoutian | G06F 11/1048 714/6.12 |
| 2017/0315891 A1* | 11/2017 | Park | G11C 29/88 |

(Continued)

FOREIGN PATENT DOCUMENTS

WO 2025221544 10/2025

OTHER PUBLICATIONS

"International Application Serial No. PCT US2025 023895, International Search Report mailed Jul. 21, 2025", 4 pages.

(Continued)

*Primary Examiner* — Marc Duncan
*Assistant Examiner* — Albert Li
(74) *Attorney, Agent, or Firm* — Schwegman Lundberg & Woessner, P.A.

(57) ABSTRACT

Aspects of the present disclosure configure a system component, such as memory sub-system controller, to transition a state of a memory sub-system into different panic handling modes. The controller detects failure of a memory sub-system and determines that self-recovery from the failure of the memory sub-system is unavailable. The controller, in response to determining that self-recovery from the failure of the memory sub-system is unavailable, incrementally transitions a state of the memory sub-system to different panic handling modes and returns the memory sub-system to a deployed mode from one of the different panic handling modes in response to successfully recovering the memory sub-system.

20 Claims, 16 Drawing Sheets

(56) References Cited

U.S. PATENT DOCUMENTS

| | | | | |
|---|---|---|---|---|
| 2018/0196718 | A1* | 7/2018 | Honda | G06F 11/0793 |
| 2021/0191651 | A1 | 6/2021 | Sharon et al. | |
| 2022/0012147 | A1* | 1/2022 | Ki | G06F 11/0754 |
| 2022/0058087 | A1* | 2/2022 | Jeon | G11C 29/52 |
| 2022/0291857 | A1 | 9/2022 | Jain | |
| 2023/0152984 | A1 | 5/2023 | Moon et al. | |
| 2023/0268005 | A1 | 8/2023 | Sarpatwari et al. | |
| 2024/0330110 | A1* | 10/2024 | Allen | G06F 11/1088 |

OTHER PUBLICATIONS

“International Application Serial No. PCT US2025 023895, Written Opinion mailed Jul. 21, 2025”, 4 pages.

* cited by examiner

| NON-PERSITENT ASSERT TYPE EXAMPLES | |
|---|---|
| UNEXPECTED NAND BEHAVIOR | • DQS DROP<br>• BROWNOUT<br>• POLLING STATUS TIMEOUT |
| POWER/NOISE STRANSIENTS | • PWR1/2/3 VOLTAGE OV, UV<br>• GPIO TX RX ERROR |
| OTHER ASSERTS CAUSED BY EXTERNAL AND NON-PERSISTENT CONDITIONS | UNEXPECTED PCIE AXI ERROR, ETC.. |

PANIC HANDLING FOR MEMORY SYSTEMS

PRIORITY APPLICATION

This application claims the benefit of priority to U.S. Provisional Application Ser. No. 63/635,726, filed Apr. 18, 2024, which is incorporated herein by reference in its entirety.

TECHNICAL FIELD

Examples of the disclosure relate generally to memory sub-systems and more specifically, to performing panic handling in a memory sub-system.

BACKGROUND

A memory sub-system can be a storage system, such as a solid-state drive (SSD), and can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The present disclosure will be understood more fully from the detailed description given below and from the accompanying drawings of various examples of the disclosure.

DETAILED DESCRIPTION

Figure 1:
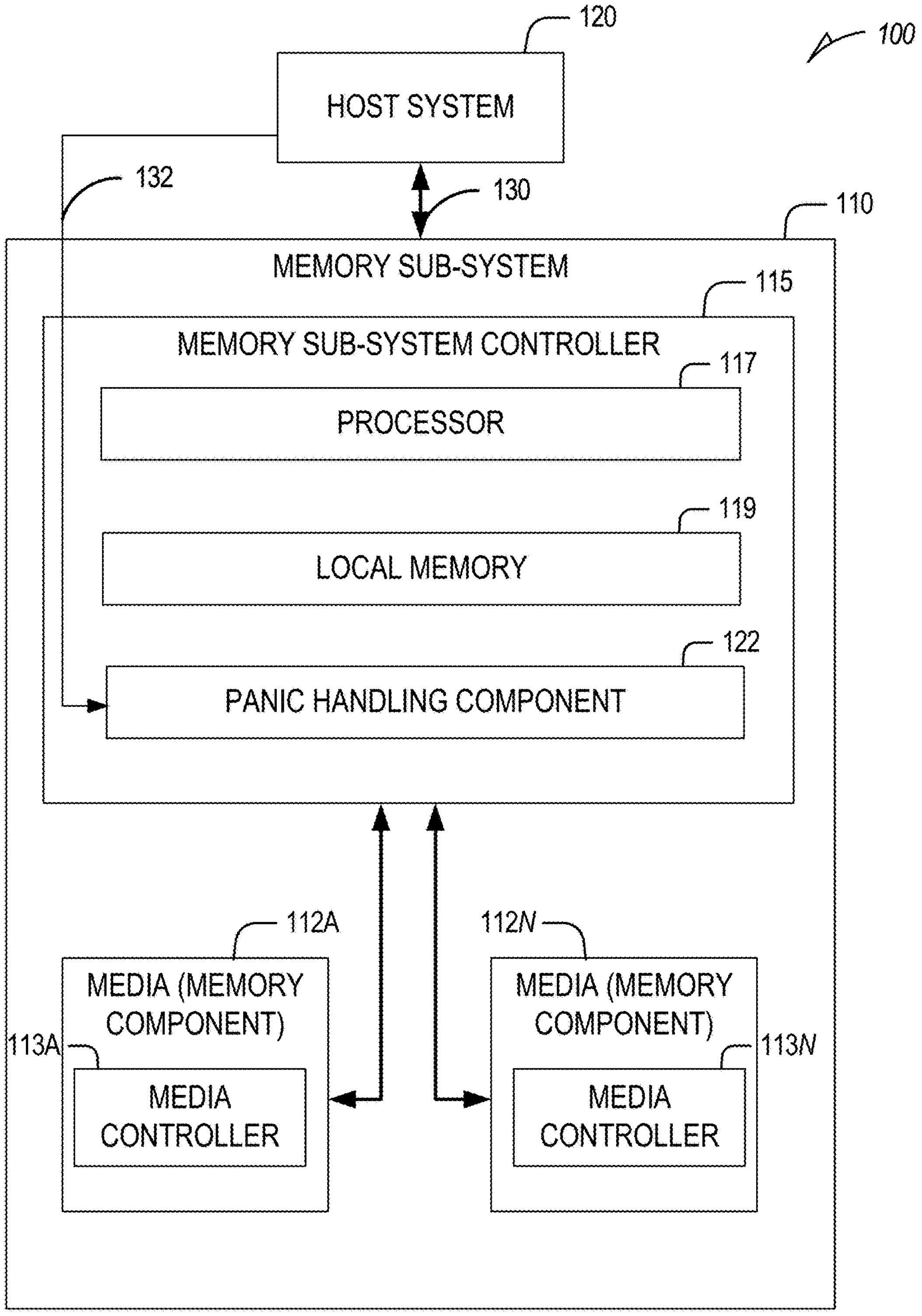
FIG. 1 is a block diagram illustrating an example computing environment including a memory sub-system, in accordance with some examples.

Aspects of the present disclosure configure a system component, such as a memory sub-system controller, to incrementally transition a memory sub-system into different panic handling modes. Specifically, in case of firmware or hardware failure, the controller selectively and incrementally transitions the memory sub-system into different panic handling modes. Each panic handling mode can restrict different types of operations from being performed and can be used to perform certain debugging operations and error handling operations. After being in one panic mode, the controller transitions the memory sub-system into another panic mode to perform different types of operations to recover the memory sub-system. After the memory sub-system is recovered, the memory sub-system is transitioned into a deployed mode which corresponds to a normal operating mode. In this way, in case of failure, the memory sub-system can be placed in different panic handling modes without entirely crippling the memory sub-system which would prevent a host from using the memory sub-system and potentially losing data. Different panic handling modes can attempt to recover normal operation of the memory sub-system while potentially continuing to satisfy certain host requests. This improves the overall efficiency of operating the memory sub-system when failure is encountered.

A memory sub-system can be a storage device, a memory module, or a hybrid of a storage device and memory module. Examples of storage devices and memory modules are described below in conjunction with FIG. 1. In general, a host system can utilize a memory sub-system that includes one or more memory components, such as memory devices that store data. The host system can send access requests (e.g., write command, read command, sequential write command, sequential read command) to the memory sub-system, such as to store data at the memory sub-system and to read data from the memory sub-system. The data specified by the host is hereinafter referred to as "host data" or "user data".

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., ECC codeword, parity code), data version (e.g., used to distinguish age of data written), valid bitmap (which LBAs or logical transfer units contain valid data), etc.

The memory sub-system can initiate media management operations, such as a write operation, on host data that is stored on a memory device. For example, firmware of the memory sub-system may re-write previously written host data from a location on a memory device to a new location as part of garbage collection management operations. The data that is re-written, for example as initiated by the firmware, is hereinafter referred to as "garbage collection data".

"User data" can include host data and garbage collection data. "System data" hereinafter refers to data that is created and/or maintained by the memory sub-system for performing operations in response to host requests and for media management. Examples of system data include, and are not limited to, system tables (e.g., logical-to-physical address mapping table), data from logging, scratch pad data, etc.

A memory device can be a non-volatile memory device. A non-volatile memory device is a package of one or more dice. Each die can comprise one or more planes. For some types of non-volatile memory devices (e.g., NAND devices), each plane comprises a set of physical blocks. For some memory devices, blocks are the smallest area than can be erased. Each block comprises a set of pages. Each page comprises a set of memory cells, which store bits of data. The memory devices can be raw memory devices (e.g., NAND), which are managed externally, for example, by an external controller. The memory devices can be managed memory devices (e.g., managed NAND), which is a raw memory device combined with a local embedded controller for memory management within the same memory device package. The memory device can be divided into one or more zones where each zone is associated with a different set of host data or user data or application.

Handling faults in memory systems, particularly in automotive solid state drives (SSDs), presents a unique set of challenges that are compounded by the stringent requirements of Functional Safety (FuSA) compliance. Ensuring that automotive SSDs do not pose unacceptable risks due to hazards caused by malfunctioning behavior is paramount. The primary goals in relation to automotive SSDs are twofold: to prevent systematic design failures and to detect and control random SSD faults effectively. Achieving these goals requires a robust error management system that is capable of navigating the complexities of automotive SSD architectures, such as those found in In-Vehicle Infotainment (IVI) systems. One of the significant challenges in error management within automotive SSDs is the difficulty in obtaining sufficient information for debugging, particularly in Ball Grid Array (BGA). The absence of direct access to NAND flash memory in such systems limits the debugging capabilities for NAND Flash Interface (NFI) failures. This is especially problematic for issues that require a deep understanding of the NAND command and address sequences being sent. Without this level of insight, pinpointing the root cause of a fault and implementing an effective solution becomes more difficult. Some conventional systems, when encountering failure, place the SSDs in a panic mode which limits access to the SSDs by the host and restricts the type of requests that can be serviced. These conventional systems fail to consider the cause of the failure and fail to attempt multiple types of panic modes before crippling the SSDs.

Furthermore, IVI automotive platforms typically do not have a dedicated Baseboard Management Controller (BMC) that can listen to the System Management Bus (SMBUS) Alert notification. This lack of a dedicated monitoring system means that any alert signals indicating faults or anomalies may go unnoticed, delaying the fault handling process. Additionally, in many IVI automotive SSDs, SMBUS support is limited to only basic management commands. This limitation restricts the range of diagnostic actions that can be performed through SMBUS, hindering comprehensive fault analysis and resolution. In contrast, Advanced Driver-Assistance Systems (ADAS) automotive SSDs support the full functionality of SMBUS, providing a more robust framework for error management. However, the disparity in SMBUS capabilities across different automotive SSDs underscores the need for a standardized approach to error management that can accommodate the varying levels of complexity and functionality within the automotive SSD landscape. Establishing such standards is crucial for ensuring FuSA compliance and maintaining the reliability and safety of automotive memory systems.

The disclosed examples address these challenges by incrementally transitioning a memory sub-system into various types of panic modes (each providing different types of debug operations and/or access types or requests that can be serviced) in case of failure. The memory sub-system may be embodied or implemented in an automotive environment making it challenging to debug without physically removing the memory sub-system. As such, rather than simply crippling the memory sub-system in case of failure and waiting for an operator to physically remove the memory sub-system for diagnosis, the disclosed techniques transition the memory sub-system into different types of panic modes first to try to recover the memory sub-system. This ensures FuSA compliance and enhances the reliability of the memory sub-system.

Specifically, the disclosed techniques provide a memory controller that detects failure of the memory sub-system. The memory controller determines that self-recovery from the failure of the memory sub-system is unavailable and in response to determining that self-recovery from the failure of the memory sub-system is unavailable, incrementally transitions a state of the memory sub-system to different panic handling modes. The memory controller returns the memory sub-system to a deployed mode from one of the different panic handling modes in response to successfully recovering the memory sub-system.

The memory sub-system can be installed in an automotive environment and is associated with at least one of an infotainment system of the automotive environment or advanced driver assistance systems (ADAS) of the automotive environment. The memory controller can detect the failure by detecting a critical event representing a critical firmware or hardware failure of the memory sub-system, the critical firmware failure being triggered by a firmware bug, the critical hardware failure being triggered by error correction errors or parity errors. The critical event can include at least one of PCIe link drops, firmware asserts, command timeouts, entering of a write protect state in the memory sub-system, loop of resets, a threshold number of interrupts being transmitted by the processing device to a host.

In some examples, the critical event includes a panic event corresponding to a critical and non-recoverable error condition encountered by the memory sub-system that adversely impacts data integrity or recoverability. The different panic handling modes can include at least one of a panic mode, a basic functional mode (BFM), a read-only mode, a write protect mode, a write abort host mode, a write protect internal mode, a thermal abort mode, a RAIN failure mode, a crippled mode, and/or a diagnostic mode. The panic mode and the crippled mode can each prevent the processing device from executing any nonvolatile memory express (NVMe) commands. The BFM can restrict the processing device to executing a limited set of NVMe commands including one or more of set features, create/delete I/O submission queue, create/delete I/O completion queue, identify controller, asynchronous event request, get features, get log page, sanitize, and security send and receive commands.

The read-only mode and write protect mode can each abort host writes to disallow write commands to the set of memory components while allowing data to be read from the set of memory components. The write abort host mode can abort non-committed write commands, and the write protect internal mode can prevent block retirement. The diagnostic mode can place the memory sub-system in a debugging state for executing one or more debug commands.

In some cases, the memory sub-system can be placed in a recovery mode, a basic functional mode or cripple mode. The memory controller generates an SMBus alert on a system management bus (SMBus) and receives a request from a host to read an alert response address in response to the host receiving the SMBus alert. The memory controller de-asserts the SMBus alert in response to receiving the request from the host and services one or more reads at a particular register.

The memory controller determines that self-recovery from the failure of the memory sub-system is available and places the memory sub-system in a write abort mode in response to determining that self-recovery from the failure of the memory sub-system is available. The memory controller saves debugging information including at least one of NVMe logs, Failure Analysis Dump/Vendor specific logs, SMART logs, or SMART extended logs and determines whether recovery of the memory sub-system was successful to condition transition to the deployed mode.

In some examples, the memory controller initially places the memory sub-system in a panic mode of the different panic handling modes. The memory controller saves debugging information in the panic mode and resets the processing device of the memory sub-system. The memory controller attempts to read user data from the set of memory components. The memory controller determines that the user data is unreadable from the set of memory components and in response to determining that the user data is readable from the set of memory components, transitions the memory sub-system into a write protect mode from the panic mode. The memory controller performs a recovery action in response to a host read of a designated register and determines whether recovery of the memory sub-system was successful to condition transition to the deployed mode.

The memory controller, in response to determining that recovery of the memory sub-system was unsuccessful, transitions the memory sub-system into a diagnostic mode from the write protect mode to enable the host to perform one or more debug operations on the memory sub-system. The memory controller determines that the user data is readable from the set of memory components. The memory controller, in response to determining that the user data is unreadable from the set of memory components, determines whether an additional failure of the memory sub-system has been detected and transitions the memory sub-system into either a basic functioning mode from the panic mode or a cripple mode based on whether the additional failure of the memory sub-system has been detected.

In some cases, the memory controller determines that self-recovery from the failure of the memory sub-system is available and saves debugging information including at least one of NVMe logs, FADupm/VS logs, SMART logs, or SMART extended logs. The memory controller determines that self-recovery of the memory sub-system was unsuccessful and, in response to determining that self-recovery of the memory sub-system was unsuccessful, determines that the failure of the memory sub-system is of a certain type. The memory controller performs different types of error recovery operations based on determining that the failure of the memory sub-system is of the certain type.

The memory controller transitions the memory sub-system into a panic mode in response to determining that the failure of the memory sub-system is not of a certain type. The memory controller, in response to determining that an additional failure of the memory sub-system has not been detected, determines whether the failure is of a non-persistent type and conditions transition of the memory sub-system into a basic functional mode based on determining whether the failure is of the non-persistent type. The memory controller, in response to determining that an additional failure of the memory sub-system has been detected, transitions the memory sub-system into either a basic functioning mode from the panic mode or a cripple mode.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing environment 100 including a memory sub-system 110, in accordance with some examples. The memory sub-system 110 can include media, such as memory components 112A to 112N (also hereinafter referred to as "memory devices"). The memory components 112A to 112N can be volatile memory devices, non-volatile memory devices, or a combination of such. In some examples, the memory sub-system 110 is a storage system. A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to a memory system via one or more primary buses 130 (e.g., an SMBus, a PCIe bus, or other suitable communication bus). The memory system can include one or more memory sub-systems 110. In some examples, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, embedded computer (e.g., one included in a vehicle, industrial equipment, or a networked commercial device), or such a computing device that includes a memory and a processing device. The host system 120 can include an automotive environment associated with one or more automotive systems, such as an ADAS and/or infotainment system. The host system 120 can include or be coupled to the memory sub-system 110 so that the host system 120 can read data from or write data to the memory sub-system 110.

The host system 120 can be coupled to the memory sub-system 110 via a physical host interface, such as one or more primary buses 130. Examples of a physical host interface include, but are not limited to, a serial advanced technology attachment (SATA) interface, a peripheral component interconnect express (PCIe) interface, a compute express link (CXL), a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe or CXL interface. The physical host interface can provide an interface for passing control, address, data, and other signals between the memory sub-system 110 and the host system 120.

The memory components 112A to 112N can include any combination of the different types of non-volatile memory components and/or volatile memory components. An example of non-volatile memory components includes a negative- and (NAND)-type flash memory. Each of the memory components 112A to 112N can include one or more arrays of memory cells such as single-level cells (SLCs) or multi-level cells (MLCs) (e.g., TLCs or QLCs). In some examples, a particular memory component 112 can include both an SLC portion and an MLC portion of memory cells.

Each of the memory cells can store one or more bits of data (e.g., blocks) used by the host system 120. Although non-volatile memory components such as NAND-type flash memory are described, the memory components 112A to 112N can be based on any other type of memory, such as a volatile memory.

In some examples, the memory components 112A to 112N can be, but are not limited to, random access memory (RAM), read-only memory (ROM), dynamic random access memory (DRAM), synchronous dynamic random access memory (SDRAM), phase change memory (PCM), magnetoresistive random access memory (MRAM), negative- or (NOR) flash memory, electrically erasable programmable read-only memory (EEPROM), and a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write-in-place operation, where a non-volatile memory cell can be programmed without the non-volatile memory cell being previously erased. Furthermore, the memory cells of the memory components 112A to 112N can be grouped as memory pages or blocks that can refer to a unit of the memory component 112 used to store data. In some examples, the memory cells of the memory components 112A to 112N can be grouped into a set of different zones of equal or unequal size used to store data for corresponding applications. In such cases, each application can store data in an associated zone of the set of different zones.

The memory sub-system controller 115 can communicate with the memory components 112A to 112N to perform operations such as reading data, writing data, or erasing data at the memory components 112A to 112N and other such operations. The memory sub-system controller 115 can include hardware such as one or more integrated circuits and/or discrete components, a buffer memory, or a combination thereof. The memory sub-system controller 115 can be a microcontroller, special-purpose logic circuitry (e.g., a field programmable gate array [FPGA], an application specific integrated circuit [ASIC], etc.), or another suitable processor. The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120. In some examples, the local memory 119 can include memory registers storing memory pointers, fetched data, and so forth. The local memory 119 can also include read-only memory (ROM) for storing microcode. While the example memory sub-system 110 in FIG. 1 has been illustrated as including the memory sub-system controller 115, in another example of the present disclosure, a memory sub-system 110 may not include a memory sub-system controller 115, and can instead rely upon external control (e.g., provided by an external host, or by a processor 117 or controller separate from the memory sub-system 110).

In general, the memory sub-system controller 115 can receive I/O commands or operations from the host system 120 and can convert the commands or operations into instructions or appropriate commands to achieve the desired access to the memory components 112A to 112N. The memory sub-system controller 115 can be responsible for other operations, based on instructions stored in firmware in an active slot or associated with an active firmware slot, such as wear leveling operations, garbage collection operations, error detection and ECC operations, decoding operations, encryption operations, caching operations, address translations between a logical block address and a physical block address that are associated with the memory components 112A to 112N, address translations between an application identifier received from the host system 120 and a corresponding zone of a set of zones of the memory components 112A to 112N. This can be used to restrict applications to reading and writing data only to/from a corresponding zone of the set of zones that is associated with the respective applications. In such cases, even though there may be free space elsewhere on the memory components 112A to 112N, a given application can only read/write data to/from the associated zone, such as by erasing data stored in the zone and writing new data to the zone. The memory sub-system controller 115 can further include host interface circuitry to communicate with the host system 120 via the physical host interface. The host interface circuitry can convert the I/O commands received from the host system 120 into command instructions to access the memory components 112A to 112N as well as convert responses associated with the memory components 112A to 112N into information for the host system 120.

The memory sub-system 110 can also include additional circuitry or components that are not illustrated. In some examples, the memory sub-system 110 can include a cache or buffer (e.g., DRAM or other temporary storage location or device) and address circuitry (e.g., a row decoder and a column decoder) that can receive an address from the memory sub-system controller 115 and decode the address to access the memory components 112A to 112N.

The memory devices can be raw memory devices (e.g., NAND), which are managed externally, for example, by an external controller (e.g., memory sub-system controller 115). The memory devices can be managed memory devices (e.g., managed NAND), which is a raw memory device combined with a local embedded controller (e.g., local media controllers) for memory management within the same memory device package. Any one of the memory components 112A to 112N can include a media controller (e.g., media controller 113A and media controller 113N) to manage the memory cells of the memory component, to communicate with the memory sub-system controller 115, and to execute memory requests (e.g., read or write) received from the memory sub-system controller 115.

In some examples, the memory sub-system controller 115 can include a panic handling component 122. The panic handling component 122 can detect failure of the memory sub-system 110 and can incrementally transition a state of the memory sub-system 110 between different types of panic states or panic handling modes. For example, the panic handling component 122 can detect failure of the memory sub-system 110 and determine that self-recovery from the failure of the memory sub-system 110 is unavailable. The panic handling component 122, in response to determining that self-recovery from the failure of the memory sub-system is unavailable, incrementally transitions a state of the memory sub-system 110 to different panic handling modes and returns the memory sub-system 110 to a deployed mode (e.g., normal operating mode) from one of the different panic handling modes in response to successfully recovering the memory sub-system 110.

The different panic handling modes can include any one or more of panic mode, a basic functional mode (BFM), a read-only mode, a write protect mode, a write abort host mode, a write protect internal mode, a thermal abort mode, a RAIN failure mode, a crippled mode, and/or a diagnostic mode. The panic mode and the crippled mode each prevents the processing device from executing any nonvolatile memory express (NVMe) commands. The BFM restricts the processing device to executing a limited set of NVMe commands comprising one or more of set features, create/delete I/O submission queue, create/delete I/O completion queue, identify controller, asynchronous event request, get features, get log page, sanitize, and security send and receive commands. The read-only mode and write protect mode each abort host writes to disallow write commands to the set of memory components 112A to 112N while allowing data to be read from the set of memory components 112A to 112N. The write abort host mode aborts non-committed write commands and wherein the write protect internal mode prevents block retirement. The diagnostic mode places the memory sub-system in a debugging state for executing one or more debug commands.

Depending on the example, the panic handling component 122 can comprise logic (e.g., a set of transitory or non-transitory machine instructions, such as firmware) or one or more components that causes the memory sub-system 110 (e.g., the memory sub-system controller 115) to perform operations described herein with respect to the panic handling component 122. The panic handling component 122 can comprise a tangible or non-tangible unit (and/or instructions) capable of performing operations described herein.

Figure 2:
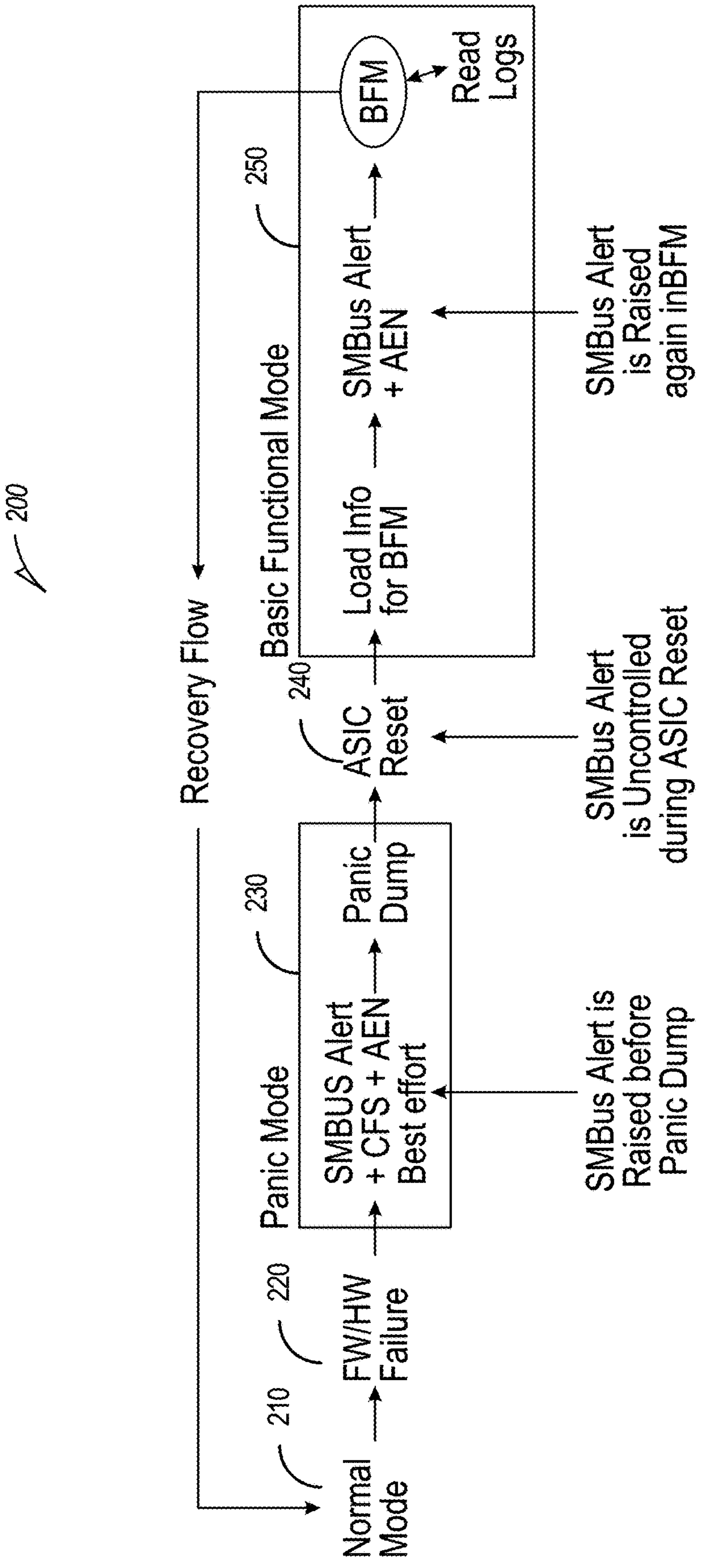
FIG. 2 is a block diagram of multiple panic handling modes, in accordance with some examples.

FIG. 2 is a block diagram of multiple panic handling modes 200, in accordance with some examples. As shown in FIG. 2, the panic handling component 122 can initially place the memory sub-system 110 in the normal operating mode 210. In this mode, the memory sub-system 110 can fully service any read/write request that is received from the host system 120. In some cases, the panic handling component 122 can detect a firmware and/or hardware failure 220. In such cases, the panic handling component 122 can transition the memory sub-system 110 into the panic mode 230.

In some cases, the panic mode 230 can perform various error handling operations and fault recovery operations. For example, the panic mode 230 can generate an SMBus alert and make that alert available and transmitted to the host system 120, such as via the one or more primary buses 130 and/or secondary buses 132 (e.g., SMBus, or other out of band bus). The panic mode 230 can receive a request from the host system 120 to read a register in response to the host system 120 receiving the SMBus alert. The panic mode 230 also stores various debugging information in one or more debug registers which can be read by the host system 120.

Following the panic mode 230, the panic handling component 122 can perform a hardware reset 240. In response to performing the hardware reset 240, the panic handling component 122 then transitions the memory sub-system 110 into the BFM 250. In the BFM 250, the panic handling component 122 performs another set of error handling and failure recovery operations. In some cases, the panic handling component 122 loads information for the BFM and generates another SMBus alert. The BFM 250 can receive a request from the host system 120 to read a register in response to the host system 120 receiving the SMBus alert. The BFM 250 can provide a set of debugging information stored in the BFM logs to the host system 120 in response to the request. The BFM 250 can receive commands from the host system 120 to recover the memory sub-system 110 (e.g., by formatting the memory sub-system 110 or sanitizing the memory sub-system 110). The panic handling component 122 then transitions the memory sub-system 110 back to the normal operating mode 210 when the failure is successfully recovered.

Figure 3:
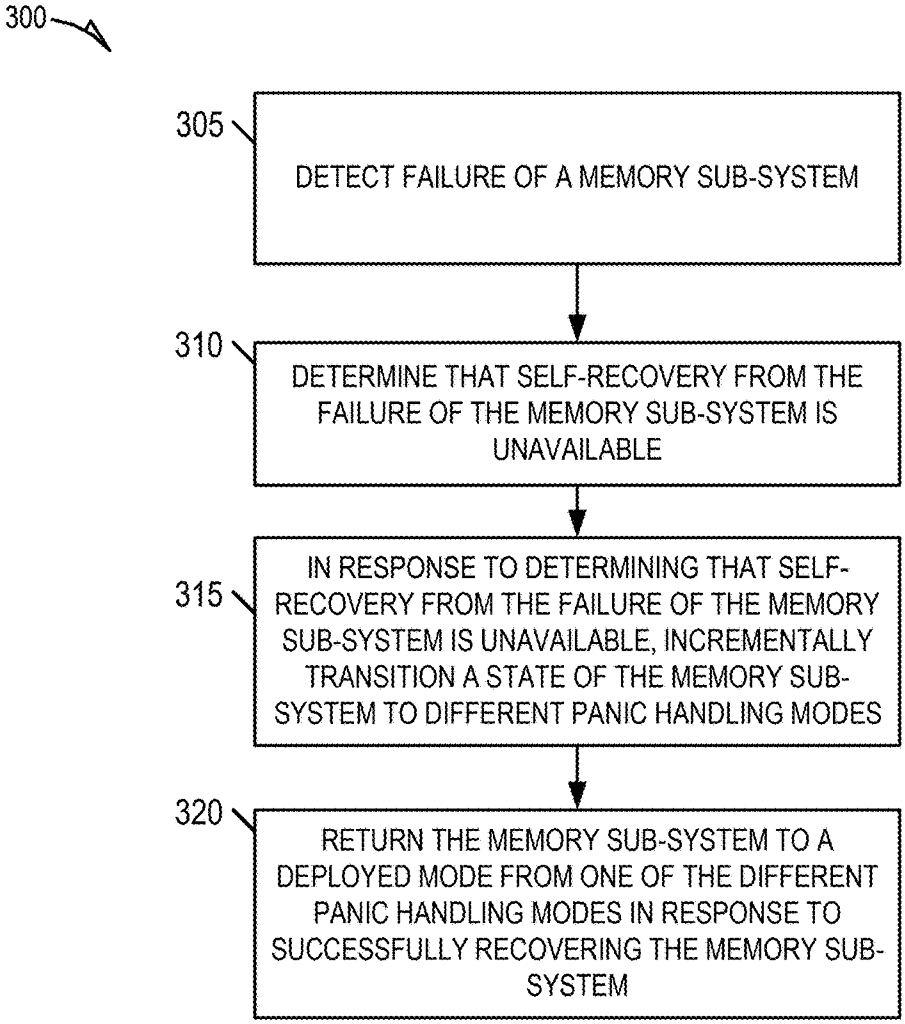
FIG. 3 is a flow diagram of an example method to incrementally transition the memory sub-system into multiple panic handling modes, in accordance with some examples.
Figure 4A:
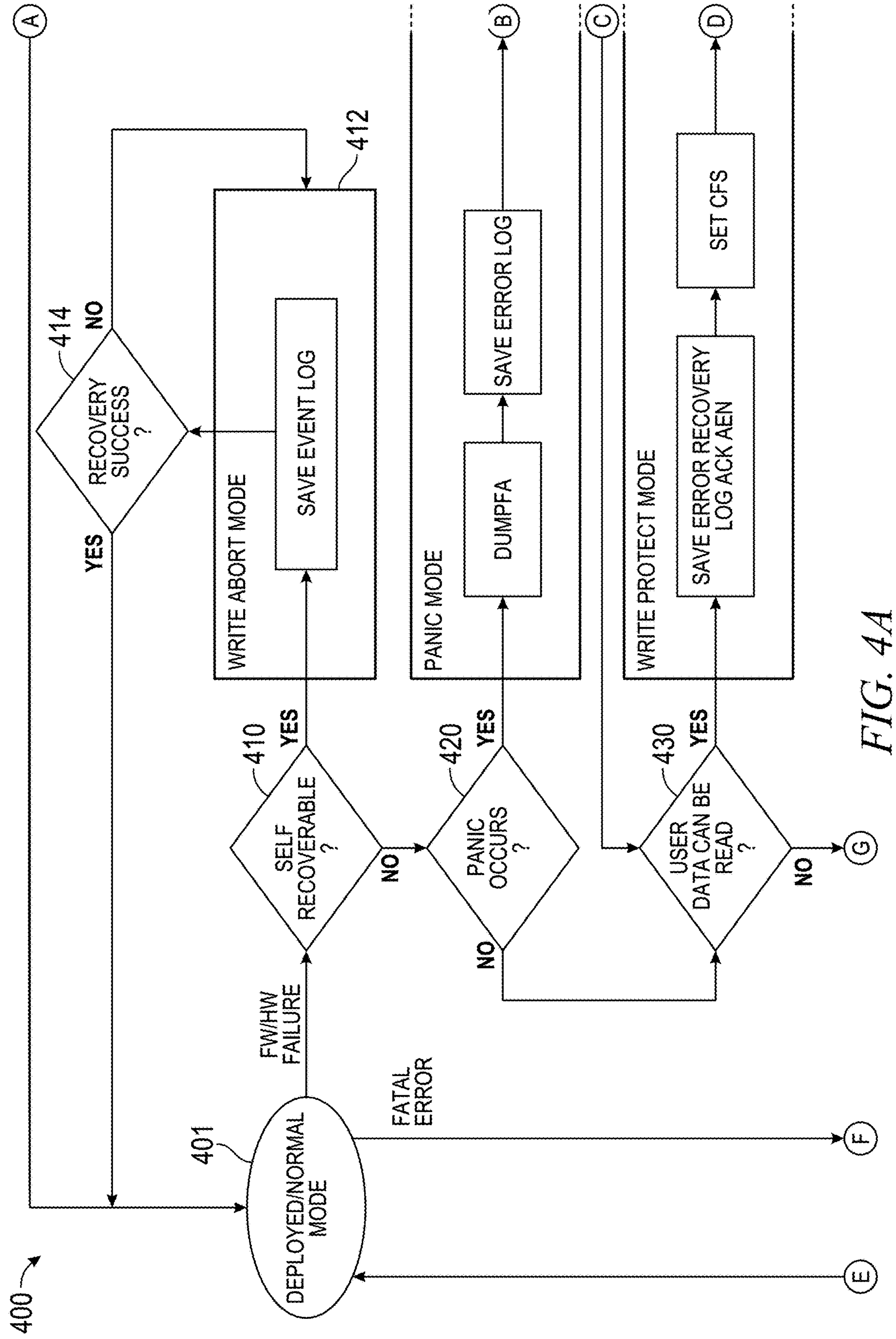
FIGS. 4A-4D and 5A-5H are example flow diagrams for incrementally transitioning the memory sub-system into multiple panic handling modes, in accordance with some examples.
Figure 4B:
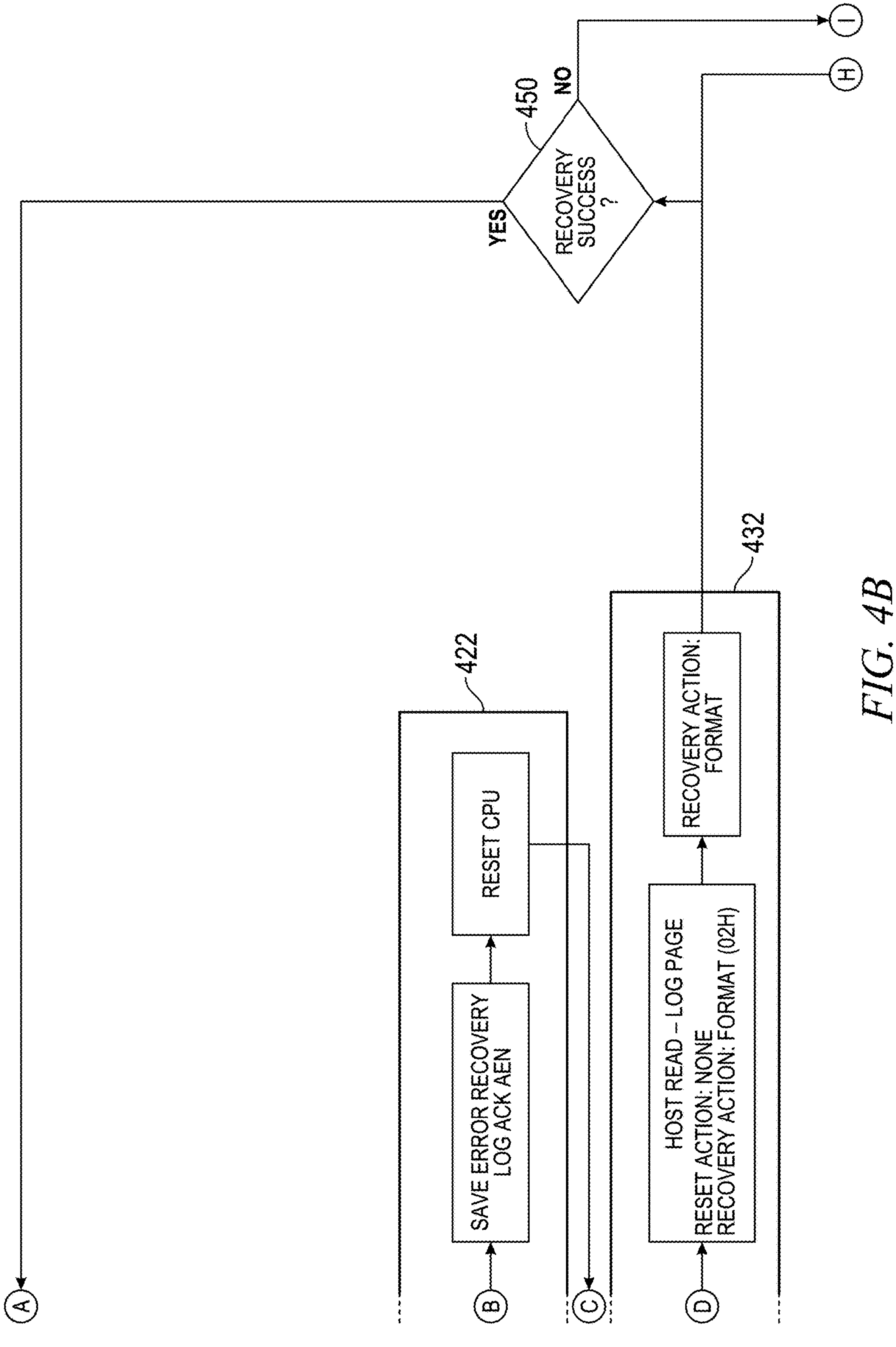
Figure 4C:
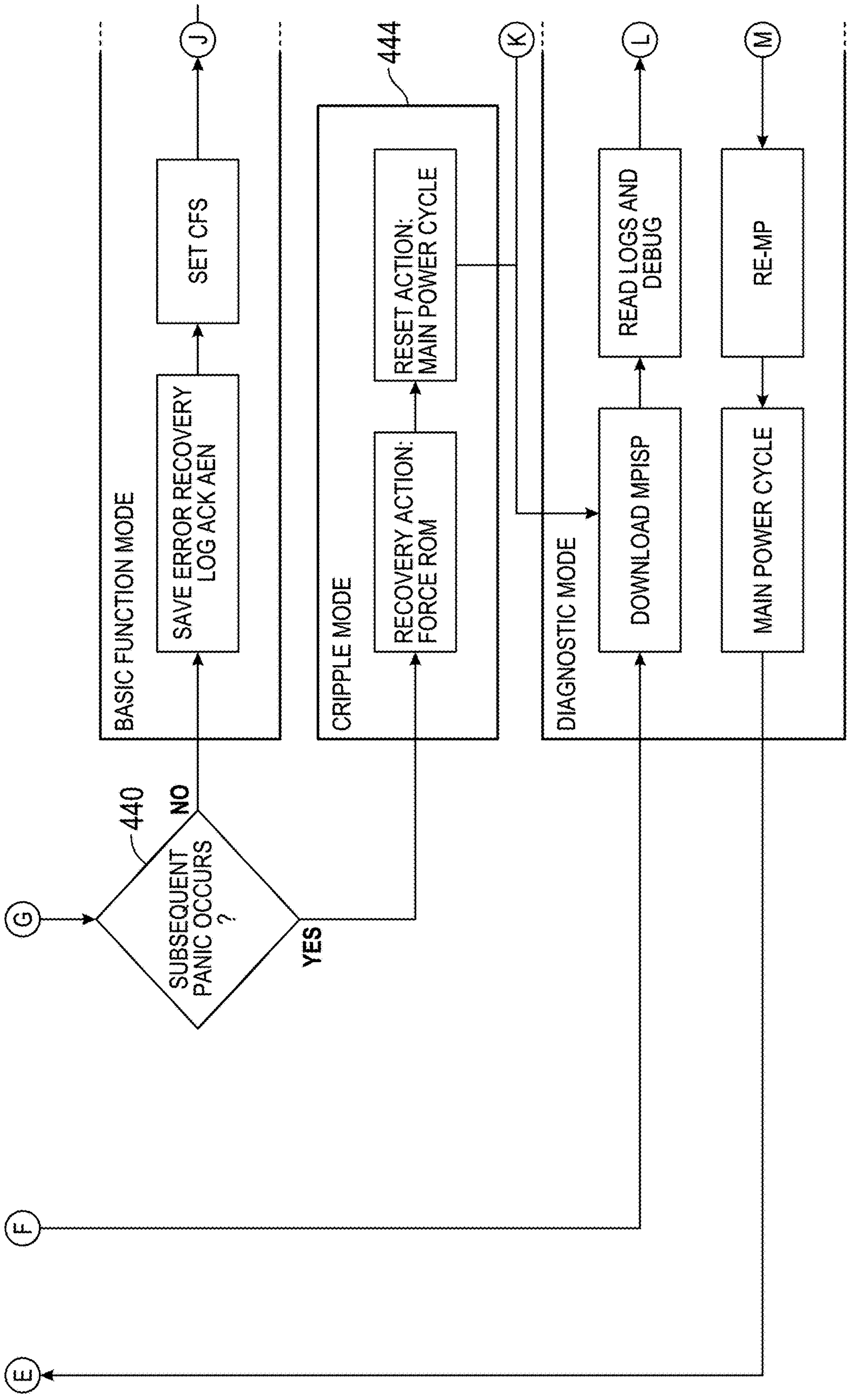
Figure 4D:
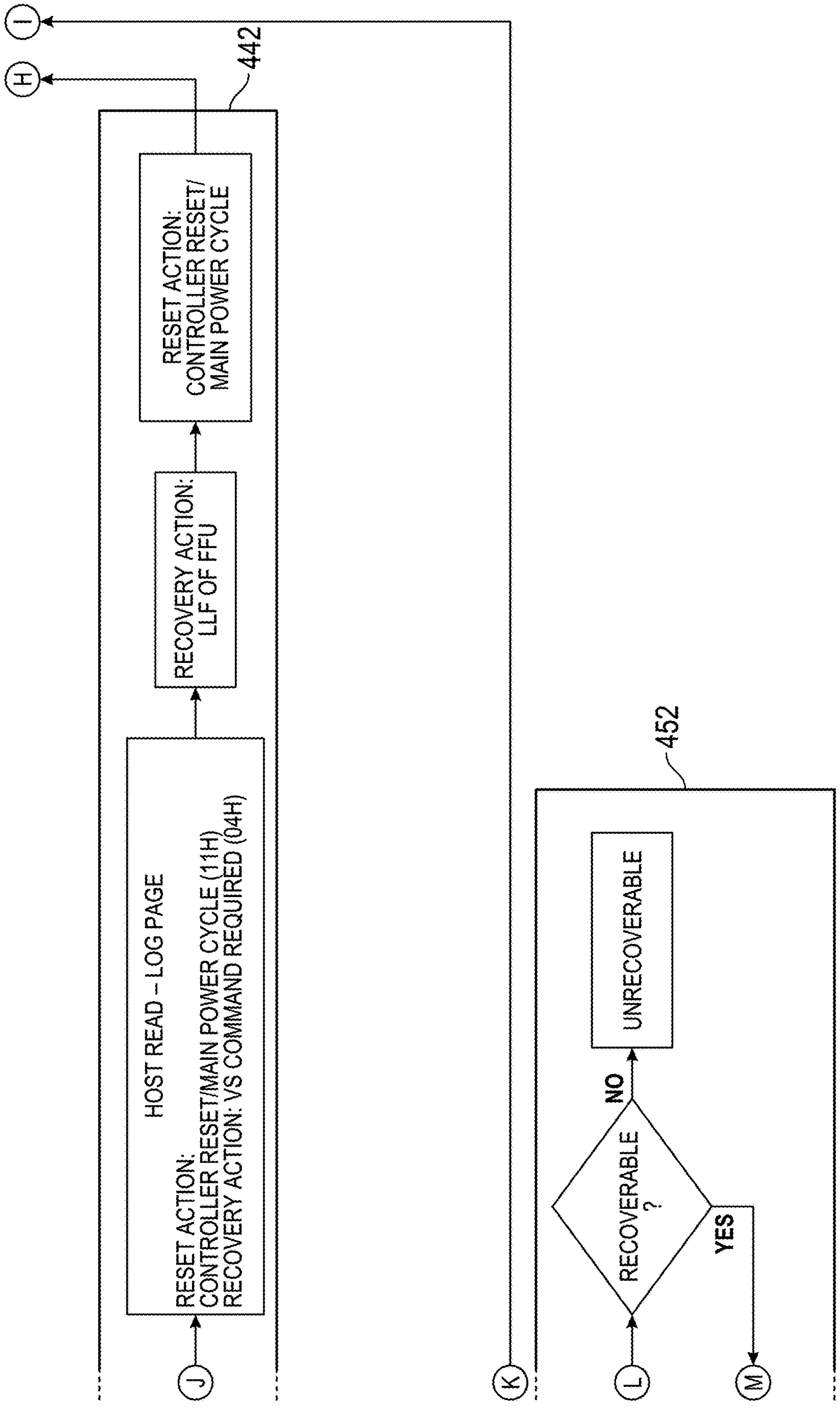
Figure 5A:
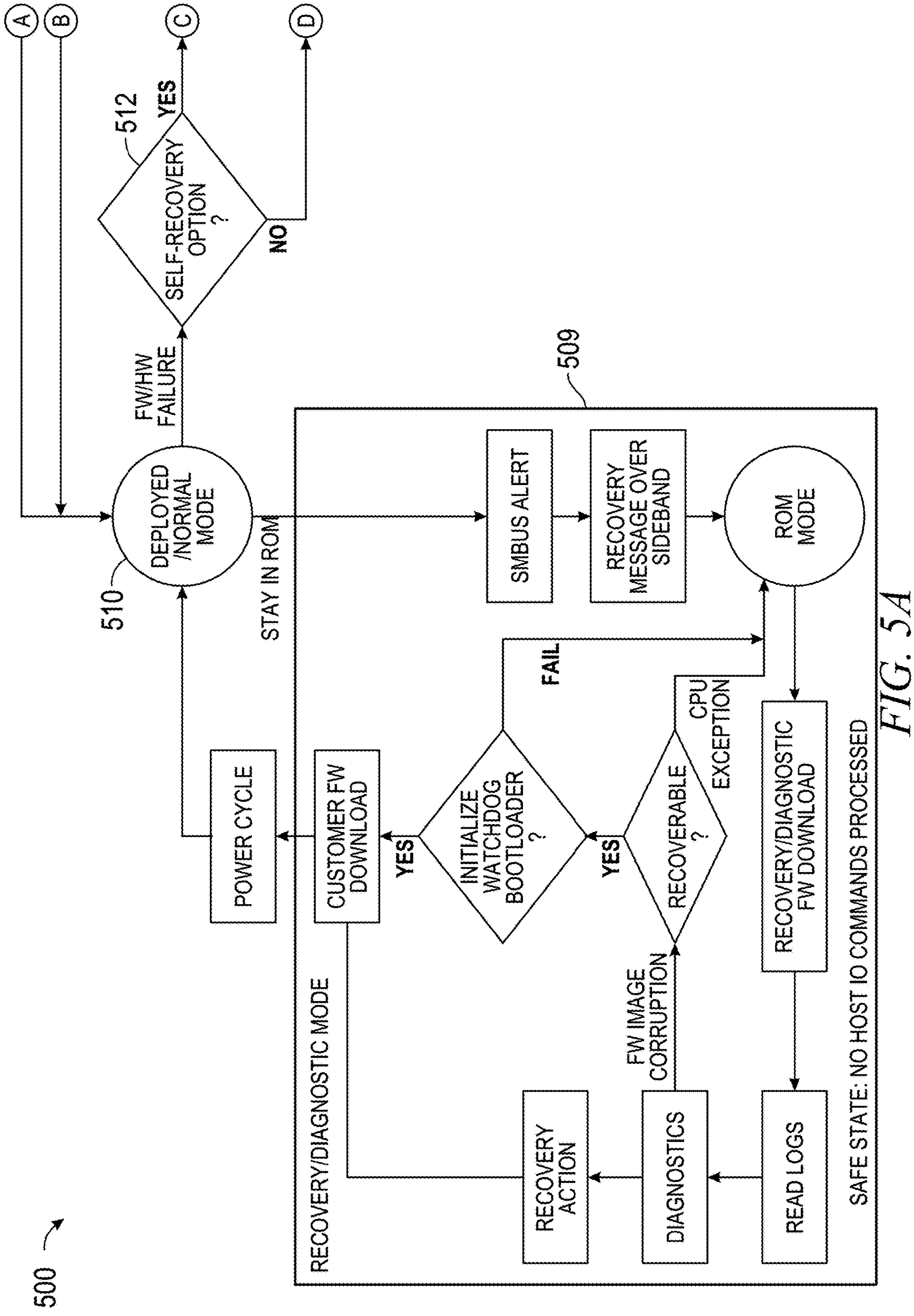
Figure 5B:
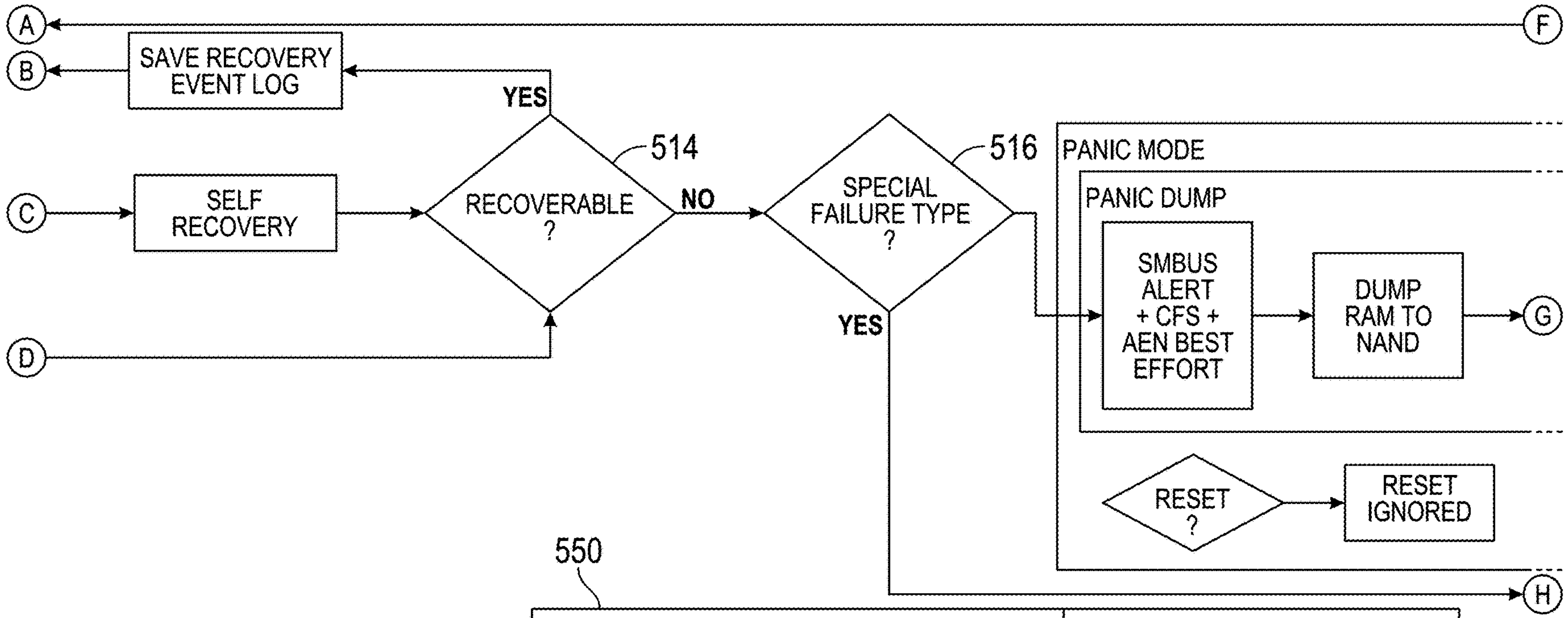
Figure 5C:
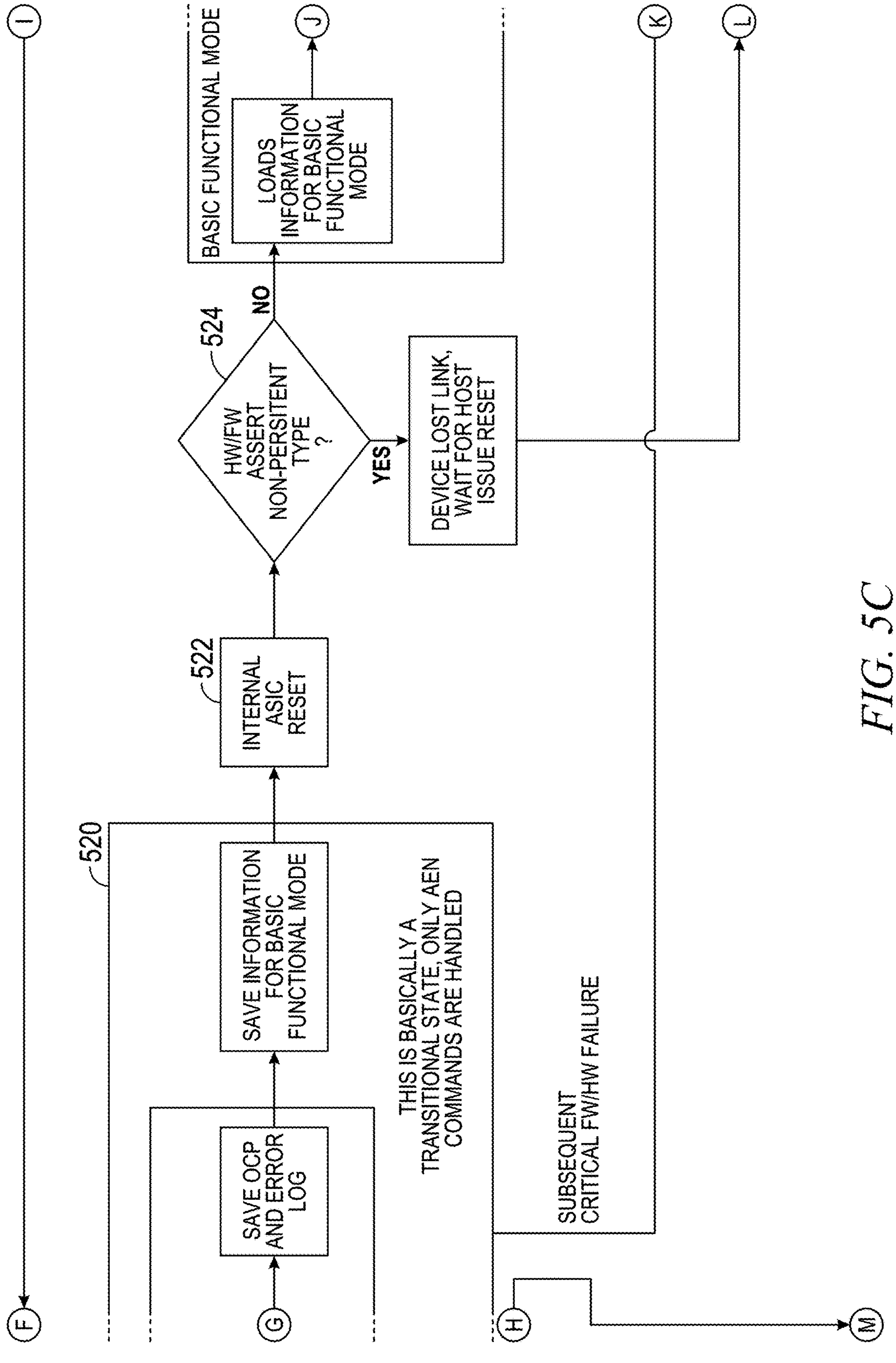
Figure 5D:
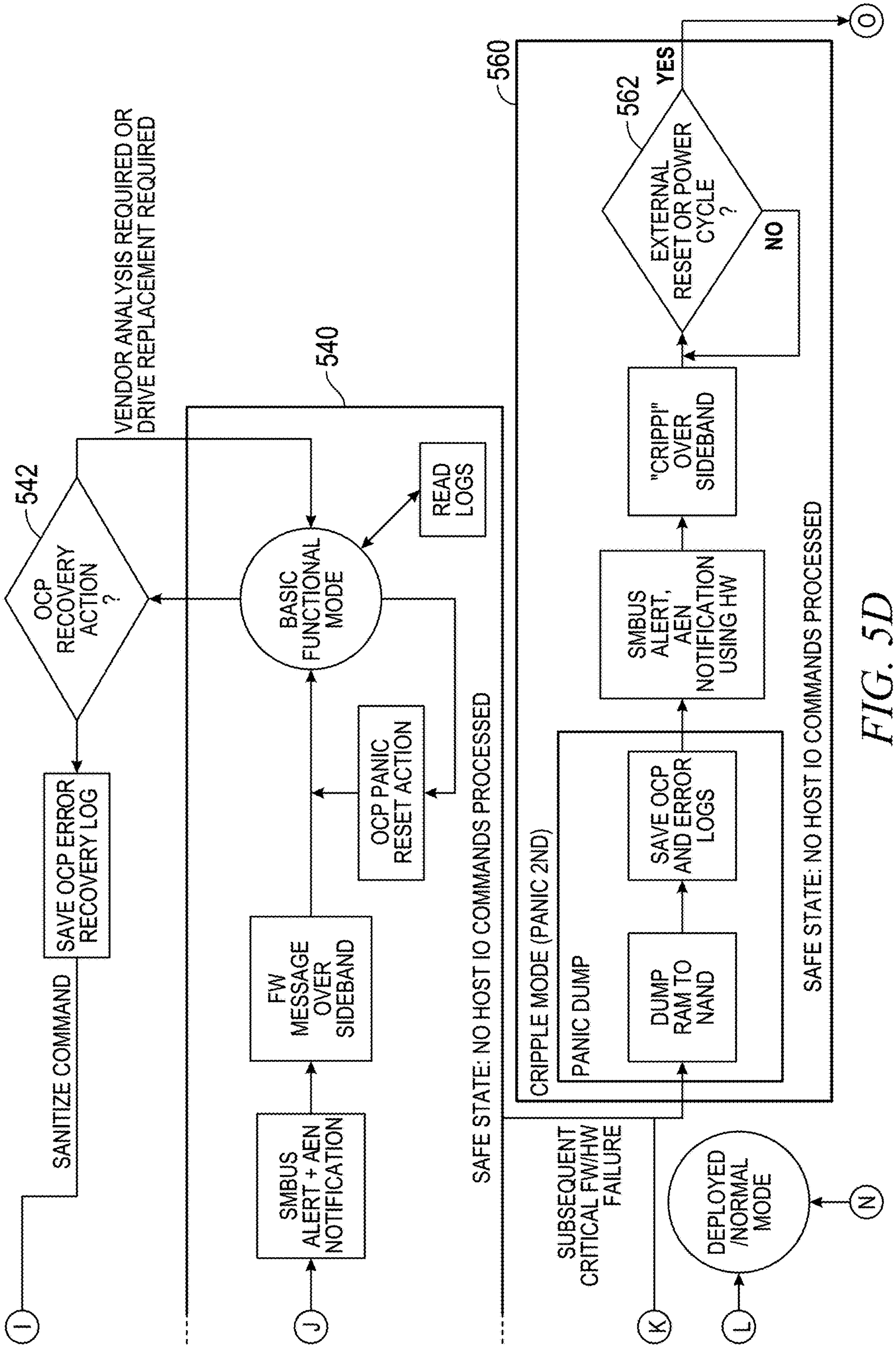
Figure 5E:
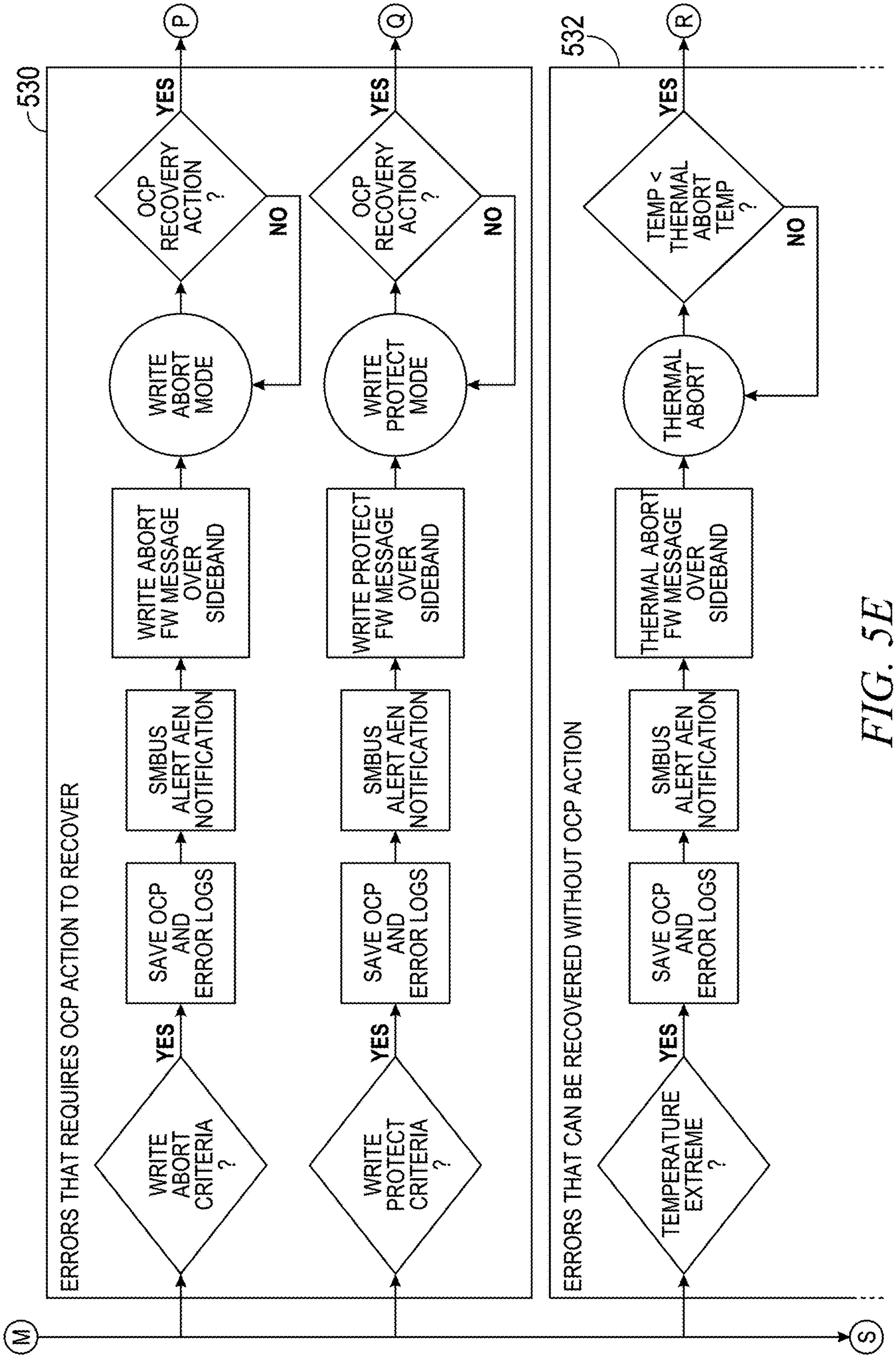
Figure 5F:
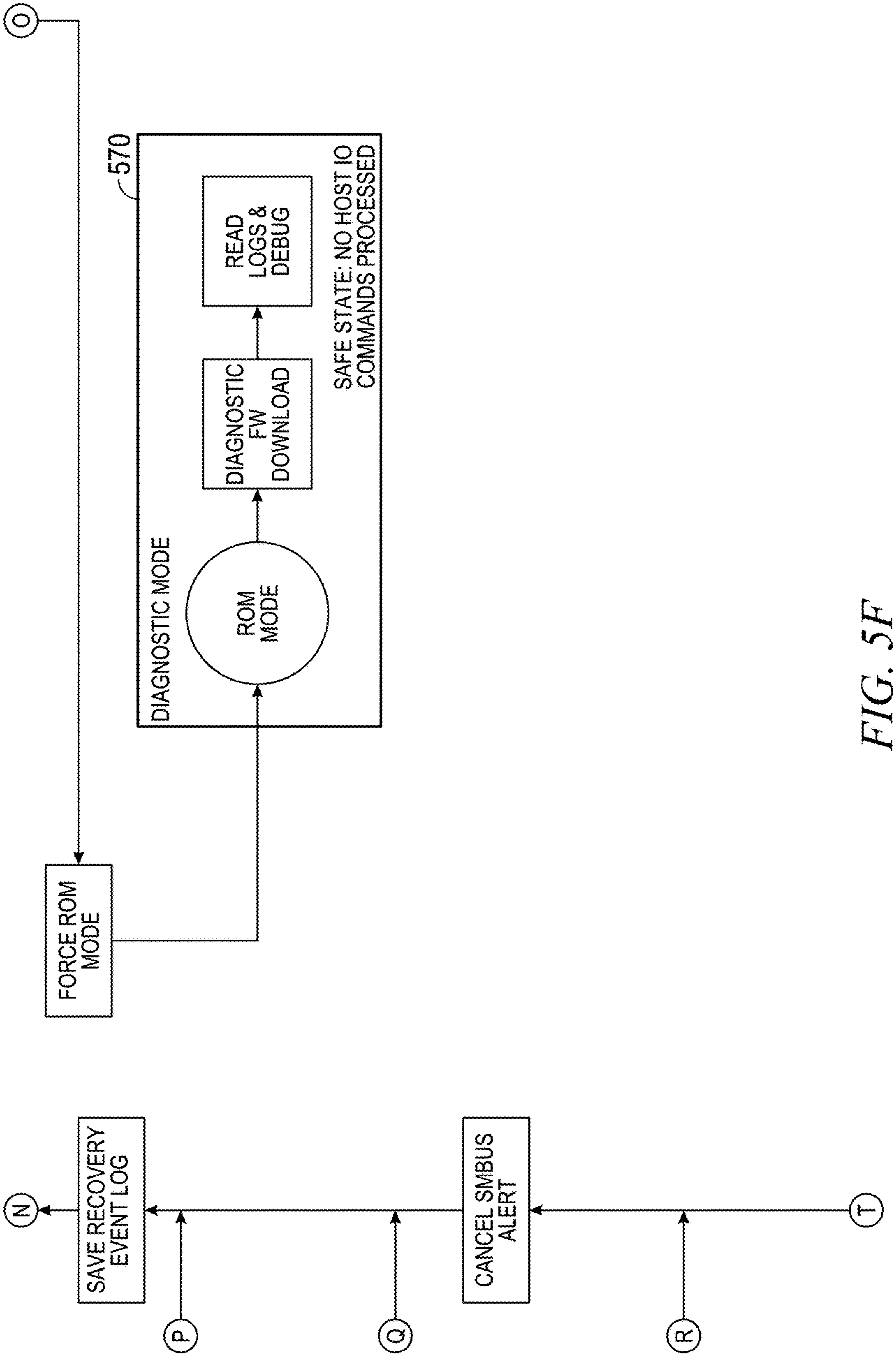
Figure 5G:
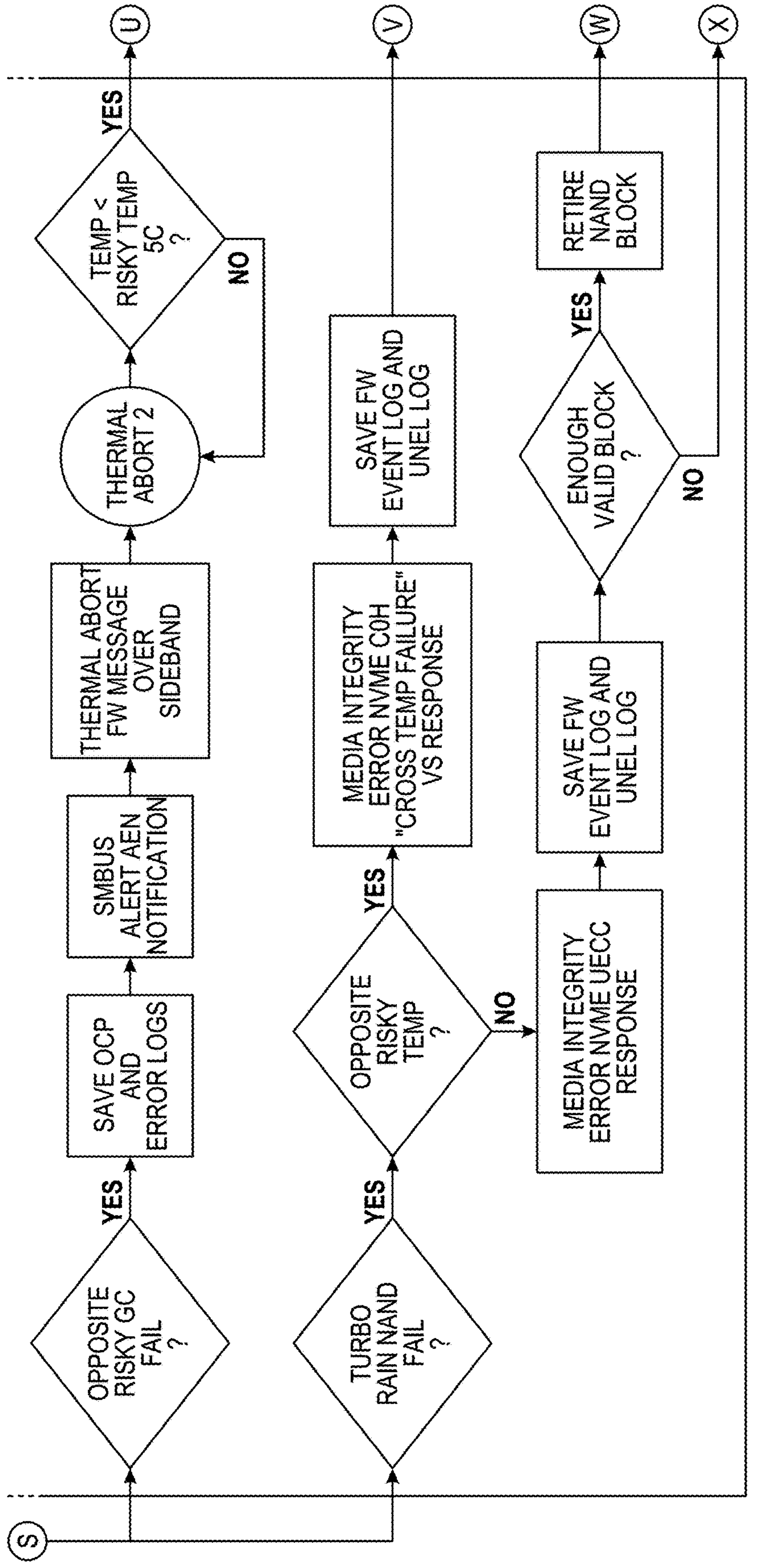
Figure 5H:
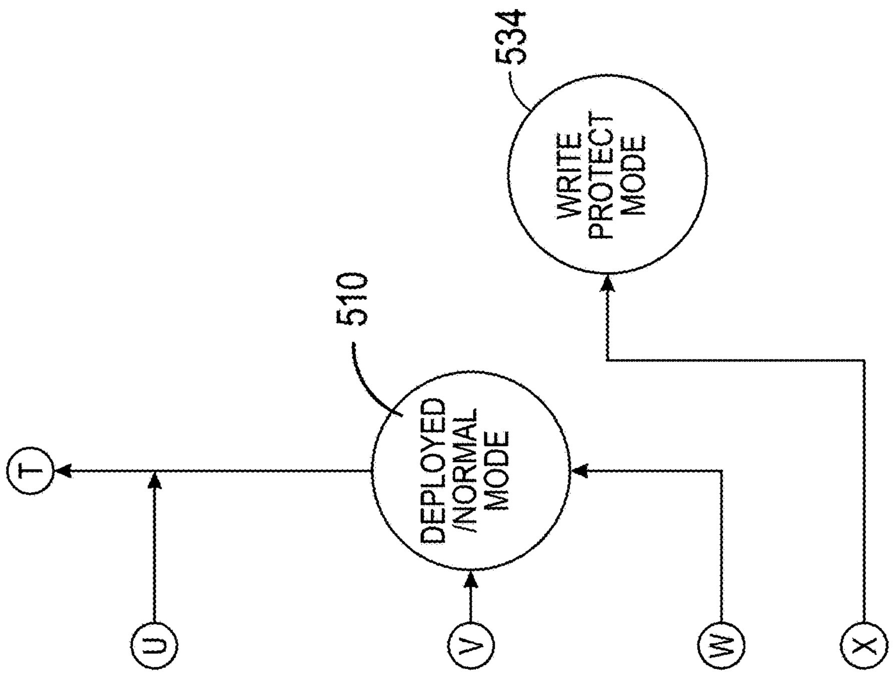

FIG. 3 is a flow diagram of an example method 300 to incrementally transition the memory sub-system 110 of FIG. 1 into different panic handling modes, in accordance with some examples. Method 300 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method 300 is performed by the memory sub-system controller 115 of FIG. 1 or subcomponents of the controller 115. In these examples, the method 300 can be performed, at least in part, by the panic handling component 122. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 3, the method (or process) 300 begins at operation 305, with the memory sub-system controller 115 detecting failure of the memory sub-system and determining that self-recovery from the failure of the memory sub-system is unavailable at operation 310. Then, at operation 315, the memory sub-system controller 115, in response to determining that self-recovery from the failure of the memory sub-system is unavailable, incrementally transitions a state of the memory sub-system to different panic handling modes. At operation 320, the memory sub-system controller 115 returns the memory sub-system to a deployed mode from one of the different panic handling modes in response to successfully recovering the memory sub-system.

FIGS. 4A-4D and 5A-5H are example flow diagrams (e.g., methods or processes) 400 and 500 for incrementally transitioning the memory sub-system into multiple panic handling modes, in accordance with some examples. Specifically, flow diagram 400 can represent operations performed by the panic handling component 122 of FIG. 1 in cases where the SMBus is not available or not utilized (e.g., in an infotainment system of an automotive environment). Flow diagram 500 can represent operations performed by the panic handling component 122 in cases where the SMBus is available (e.g., in a ADAS of an automotive environment). The operations performed in flow diagram 500 can similarly be performed in cases where the SMBus is not available or not utilized and operations performed in flow diagram 400 can similarly be performed in cases where the SMBus is available.

As shown in diagram 400, the memory sub-system 110 of FIG. 1 is initially placed in a deployed (normal) operating mode 401. The panic handling component 122 can detect a failure in the operating mode 401. The failure can be a firmware or hardware failure representing a critical event representing a critical firmware or hardware failure of the memory sub-system 110. The critical firmware failure can be triggered by a firmware bug and the critical hardware failure can be triggered by error correction errors or parity errors. The critical event can include at least one of PCIe link drops, firmware asserts, command timeouts, entering of a write protect state in the memory sub-system, loop of resets, a threshold number of interrupts being transmitted by the processing device to a host. The critical event can include a panic event corresponding to a critical and non-recoverable error condition encountered by the memory sub-system 110 that adversely impacts data integrity or recoverability.

In some cases, the panic handling component 122 determines that the failure is a fatal error. In such cases, the panic handling component 122 transitions the memory sub-system 110 to a diagnostic mode 452. In this diagnostic mode 452, the panic handling component 122 can download a debugging firmware, such as from the host system 120 of FIG. 1 and can place the debugging firmware in a particular firmware slot. The panic handling component 122 can then instruct the memory sub-system controller 115 of FIG. 1 to re-boot using the particular firmware slot. The debugging firmware can be configured to generate and track many more debugging states of the memory sub-system 110 than the firmware normally uses to operate the memory sub-system 110.

The panic handling component 122 can retrieve various debugging information from registers of the memory sub-system 110 and provide that debugging information to the host system 120. The panic handling component 122 can determine whether the fatal error is recoverable based on one or more debug commands received from the host system 120, such as via the secondary buses 132 of FIG. 1. If so, the panic handling component 122 instructs the memory sub-system controller 115 to reboot using the firmware that is stored or referenced by the normal firmware slot and returns the memory sub-system 110 to the operating mode 401.

In cases where the failure is non-fatal, the panic handling component 122 determines at operation 410 whether the failure is self-recoverable. If so, the panic handling component 122 transitions the memory sub-system 110 into the write abort mode 412. In this mode, the panic handling component 122 saves an event log indicating the failure and attempts to resolve the failure automatically. The panic handling component 122 determines at operation 414 whether the failure has been successfully recovered. If so, the panic handling component 122 transitions the memory sub-system 110 to the operating mode 401 and if not, the panic handling component 122 continues to remain in the write abort mode 412 to continue attempting to resolve the failure.

In some cases, the panic handling component 122 determines that the failure is not self-recoverable. In such cases, the panic handling component 122 determines whether a panic event occurs at operation 420. A panic event can represent a situation in which the entire memory sub-system 110 includes uncorrectable errors. A panic event can be detected if there is data corruption at risk, inexplicable cursor states, continued operation may result in sending incorrect data to the host system 120, corruption of the L2P table, firmware execution or drive state cannot be trusted, firmware image or configuration file cyclic redundancy check (CRC) failure, memory POST failure, or a hardware component having a fault that cannot be worked around by the firmware (e.g., the entire NAND channel is unresponsive, PMIC unresponsiveness, or DRAM has repeatable uncorrectable errors). If so, the panic handling component 122 transitions the memory sub-system 110 into the panic mode 422. If not, the panic handling component 122 further determines at operation 430 whether user data can be read from the set of memory components 112A to 112N of FIG. 1.

In the panic mode 422, the panic handling component 122 can dump various debugging information and save an error log representing the failure and error states. The panic handling component 122 can save the error recovery log and transmit a message to the host system 120, such as via the one or more primary buses 130 of FIG. 1 and/or the secondary buses 132. Then, the panic handling component 122 can reset the memory sub-system controller 115 and continue to perform operation 430. At operation 430, the panic handling component 122 can determine whether user data can be read from the set of memory components 112A to 112N. If so, the panic handling component 122 transitions the memory sub-system 110 into the write protect mode 432. If not, the panic handling component 122 performs operation 440 to determine whether an additional panic or hardware failure occurs.

In the write protect mode 432, the panic handling component 122 saves the error recovery log and writes error information into one or more registers that can be read by the host system 120. In some cases, the panic handling component 122 receives a request from the host system 120 to read the registers and receives recovery commands (e.g., one or more debug commands) from the host system 120. The panic handling component 122 can then perform a recovery operation, such as formatting the set of memory components 112A to 112N. The panic handling component 122 then performs operation 450 to determine whether recovery of the memory sub-system 110 was successful. If so, the panic handling component 122 returns the memory sub-system 110 to the operating mode 401. If not, the panic handling component 122 transitions the memory sub-system 110 to the diagnostic mode 452.

At operation 430, the panic handling component 122 can determine that the user data cannot be read from the set of memory components 112A to 112N. In such cases, the panic handling component 122 performs operation 440 to determine whether an additional panic or failure occurs. If not, the panic handling component 122 transitions the memory sub-system 110 to the BFM 442. In response to the panic handling component 122 determining that additional panic or failure occurred or was detected, the panic handling component 122 transitions the memory sub-system 110 to the cripple mode 444.

In the BFM 442 the panic handling component 122 saves the error recovery log and writes error information into one or more registers that can be read by the host system 120. In some cases, the panic handling component 122 receives a request from the host system 120 to read the registers and receives recovery commands (e.g., one or more debug commands) from the host system 120. The panic handling component 122 can then perform a recovery operation, such as formatting the set of memory components 112A to 112N (e.g., field level format and/or low level format which may retain some of the debugging information). The panic handling component 122 then resets the memory sub-system controller 115 and performs operation 450 to determine whether recovery of the memory sub-system 110 was successful. If so, the panic handling component 122 returns the memory sub-system 110 to the operating mode 401. If not, the panic handling component 122 transitions the memory sub-system 110 to the diagnostic mode 452.

In the cripple mode 444, the panic handling component 122 places the memory sub-system 110 in read only mode and resets the memory sub-system controller 115. Then, the panic handling component 122 transitions the memory sub-system 110 to the diagnostic mode 452 for debugging operations to be performed by the host system 120.

In some examples, the panic handling component 122 performs a different sequence of transitions in case of a failure of the memory sub-system 110. For example, as shown in flow diagram 500, the memory sub-system 110 may initially operate in the normal or deployed mode 510. The panic handling component 122 can detect a failure and, in response, can determine at operation 512 whether self-recovery is available to resolve the failure. If so, the panic handling component 122 performs self-recovery operations and proceeds to operation 514 to determine if recovery was successful. If the failure is not available for self-recovery, the panic handling component 122 proceeds directly to operation 514. If the panic handling component 122 determines that recovery is successful at operation 514, the panic handling component 122 saves the recovery information in a log and returns to the normal or deployed mode 510. In response to determining at operation 514 that recovery was unsuccessful, the panic handling component 122 performs operation 516 to determine if the failure is of a specified or special type.

In response to determining at operation 516 that the failure is of a specified or special type, the panic handling component 122, performs a sequence of error handling operations 530 and 532. Error handling operations 530 represent errors that need external action to recover. For example, the panic handling component 122 determines if write abort criteria is satisfied by the failure. If so, the panic handling component 122 saves debugging information, generates an SMBus alert to notify the host system 120, writes an abort message over the secondary buses 132 and enters the write abort mode. The panic handling component 122 remains in the write abort mode until recovery action is performed by the host system 120 and then saves the error information in a log and returns to the normal or deployed mode 510. As another example, the panic handling component 122 determines if write protect criteria is satisfied by the failure. If so, the panic handling component 122 saves debugging information, generates an SMBus alert to notify the host system 120, writes a write protect message over the secondary buses 132 and enters the write protect mode. The panic handling component 122 remains in the write protect mode until recovery action is performed by the host system 120 and then saves the error information in a log and returns to the normal or deployed mode 510.

As another example, the panic handling component 122 determines if the memory sub-system 110 temperature is greater than a specified threshold temperature. If so, the panic handling component 122 saves debugging information, generates an SMBus alert to notify the host system 120, writes a thermal abort message over the secondary buses 132 and enters the thermal abort mode. The panic handling component 122 remains in the thermal abort mode until the temperature is below the thermal abort temperature threshold and then cancels the SMBus alert and saves the error information in a log and returns to the normal or deployed mode 510. In some cases, the panic handling component 122 determines if RAIN associated with the memory sub-system 110 failed. If so, the panic handling component 122 determines if the memory sub-system 110 is operating under risky temperature (e.g., the temperature of the memory sub-system 110 is greater than a risk threshold). If the memory sub-system 110 is operating under risky temperature, the panic handling component 122 saves the debugging information and indication of this failure and returns to the normal or deployed mode 510. If not, the panic handling component 122 saves the debugging information and determines if there are enough valid blocks. If there are enough valid blocks, the panic handling component 122 retires the NAND block and returns to the normal or deployed mode 510. If there are not enough valid blocks, the panic handling component 122 transitions the memory sub-system 110 to the write protect mode 534.

In response to determining that the failure is not of the certain type or special type at operation 516, the panic handling component 122 transitions the memory sub-system 110 to the panic mode 520. The panic handling component 122 may perform similar operations in the panic mode 520 as discussed above in connection with the panic mode 422. In this mode, the panic handling component 122 performs a reset operation 522 (after saving the debugging information) and proceeds to operation 524 to determine if the failure is of a non-persistent type (e.g., unexpected NAND behaviors, such as DQS drop, brownout, polling status timeout; power/noise transients; or other asserts caused by external and non-persistent conditions, such as unexpected PCIe errors). In such cases, the panic handling component 122 performs a device lost link waiting for the host system 120 to issue a reset and then returns to the normal or deployed mode 510.

In response to determining that the failure is not of the non-persistent type, the panic handling component 122 transitions the memory sub-system 110 to the BFM 540. BFM 540 may perform similar operations as BFM 442. The panic handling component 122 can determine if recovery was successful after entering the BFM 540 at operation 542. The panic handling component 122 remains in the BFM 540 until recovery is successful at which point debugging information is stored and the memory sub-system 110 returns to normal or deployed mode 510.

During the panic mode 520 and/or the BFM 540, the panic handling component 122 can determine if additional failure is detected. If so, the panic handling component 122 transitions the memory sub-system 110 to the cripple mode 560. The panic handling component 122 can wait in operation 562 of the cripple mode 560 for an external recovery operation to be performed at which point the panic handling component 122 transitions the memory sub-system 110 to the diagnostic mode 570. In some cases, the panic handling component 122 transitions the memory sub-system 110 to a stay in ROM mode 509 from the normal or deployed mode 510 and/or other modes discussed above. In some examples, when the memory sub-system 110 is placed in the cripple mode (discussed above), the memory sub-system 110 can generate a specified blink pattern for a light emitting diode (LED) of the memory sub-system 110 (e.g., blink 100 milliseconds low, 100 milliseconds high from entry to exit of the cripple mode). In some cases, each of the different panic modes discussed above can be associated with a different blink pattern for the LED of the memory sub-system 110.

In view of the disclosure above, various examples are set forth below. It should be noted that one or more features of an example, taken in isolation or combination, should be considered within the disclosure of this application.

Example 1: A system comprising: a memory sub-system comprising a set of memory components; a processing device, operatively coupled to the set of memory components and configured to perform operations comprising: detecting failure of the memory sub-system; determining that self-recovery from the failure of the memory sub-system is unavailable; in response to determining that self-recovery from the failure of the memory sub-system is unavailable, incrementally transitioning a state of the memory sub-system to different panic handling modes; and returning the memory sub-system to a deployed mode from one of the different panic handling modes in response to successfully recovering the memory sub-system.

Example 2. The system of Example 1, wherein the memory sub-system is installed in an automotive environment and is associated with at least one of an infotainment system of the automotive environment or advanced driver assistance systems (ADAS) of the automotive environment.

Example 3. The system of any one of Examples 1-2, wherein detecting the failure comprises detecting a critical event representing a critical firmware or hardware failure of the memory sub-system, the critical firmware failure being triggered by a firmware bug, the critical hardware failure being triggered by error correction errors or parity errors.

Example 4. The system of Example 3, wherein the critical event comprises at least one of PCle link drops, firmware asserts, command timeouts, entering of a write protect state in the memory sub-system, loop of resets, a threshold number of interrupts being transmitted by the processing device to a host.

Example 5. The system of any one of Examples 3-4, wherein the critical event comprises a panic event corresponding to a critical and non-recoverable error condition encountered by the memory sub-system that adversely impacts data integrity or recoverability.

Example 6. The system of any one of Examples 1-5, wherein the different panic handling modes comprise at least one of a panic mode, a basic functional mode (BFM), a read-only mode, a write protect mode, a write abort host mode, a write protect internal mode, a thermal abort mode, a RAIN failure mode, a crippled mode, or a diagnostic mode.

Example 7. The system of Example 6, wherein the panic mode and the crippled mode each prevents the processing device from executing any nonvolatile memory express (NVMe) commands, wherein the BFM restricts the processing device to executing a limited set of NVMe commands comprising one or more of set features, create/delete I/O submission queue, create/delete I/O completion queue, identify controller, asynchronous event request, get features, get log page, sanitize, and security send and receive commands.

Example 8. The system of any one of Examples 6-7, wherein the read-only mode and write protect mode each abort host writes to disallow write commands to the set of memory components while allowing data to be read from the set of memory components.

Example 9. The system of any one of Examples 6-8, wherein the write abort host mode aborts non-committed write commands, and wherein the write protect internal mode prevents block retirement.

Example 10. The system of any one of Examples 6-9, wherein the diagnostic mode places the memory sub-system in a debugging state for executing one or more debug commands.

Example 11. The system of any one of Examples 1-10, wherein the state of the memory sub-system is placed in a recovery mode, a basic functional mode or cripple mode, the operations comprising: generating an SMBus alert on a system management bus (SMBus); receiving a request from a host to read an alert response address in response to the host receiving the SMBus alert; de-asserting the SMBus alert in response to receiving the request from the host; and servicing one or more reads at a particular register.

Example 12. The system of any one of Examples 1-11, the operations comprising: determining that self-recovery from the failure of the memory sub-system is available; placing the memory sub-system in a write abort mode in response to determining that self-recovery from the failure of the memory sub-system is available; saving debugging information comprising at least one of NVMe logs, FADupm/VS logs, SMART logs, or SMART extended logs; and determining whether recovery of the memory sub-system was successful to condition transition to the deployed mode.

Example 13. The system of Example 12, the operations comprising: initially placing the memory sub-system in a panic mode of the different panic handling modes; saving debugging information in the panic mode; resetting the processing device of the memory sub-system; and attempting to read user data from the set of memory components.

Example 14. The system of Example 13, the operations comprising: determining that the user data is unreadable from the set of memory components; in response to determining that the user data is readable from the set of memory components, transitioning the memory sub-system into a write protect mode from the panic mode; performing a recovery action in response to a host read of a designated register; and determining whether recovery of the memory sub-system was successful to condition transition to the deployed mode.

Example 15. The system of Example 14, the operations comprising: in response to determining that recovery of the memory sub-system was unsuccessful, transitioning the memory sub-system into a diagnostic mode from the write protect mode to enable the host to perform one or more debug operations on the memory sub-system.

Example 16. The system of Example 13, the operations comprising: determining that the user data is readable from the set of memory components; in response to determining that the user data is unreadable from the set of memory components, determining whether an additional failure of the memory sub-system has been detected; and transitioning the memory sub-system into either a basic functioning mode from the panic mode or a cripple mode based on whether the additional failure of the memory sub-system has been detected.

Example 17. The system of any one of Examples 1-16, the operations comprising: determining that self-recovery from the failure of the memory sub-system is available; saving debugging information comprising at least one of NVMe logs, Failure Analysis Dump/Vendor Specific logs, SMART logs, or SMART extended logs; determining that self-recovery of the memory sub-system was unsuccessful; in response to determining that self-recovery of the memory sub-system was unsuccessful, determining that the failure of the memory sub-system is of a certain type; and performing different types of error recovery operations based on determining that the failure of the memory sub-system is of the certain type.

Example 18. The system of Example 17, the operations comprising: transitioning the memory sub-system into a panic mode in response to determining that the failure of the memory sub-system is not of the certain type; in response to determining that an additional failure of the memory sub-system has not been detected, determining whether the failure is of a non-persistent type; conditioning transition of the memory sub-system into a basic functional mode based on determining whether the failure is of the non-persistent type; and in response to determining that an additional failure of the memory sub-system has been detected, transitioning the memory sub-system into either a basic functioning mode from the panic mode or a cripple mode.

Methods and computer-readable storage medium with instructions for performing any one of the above Examples.

Figure 6:
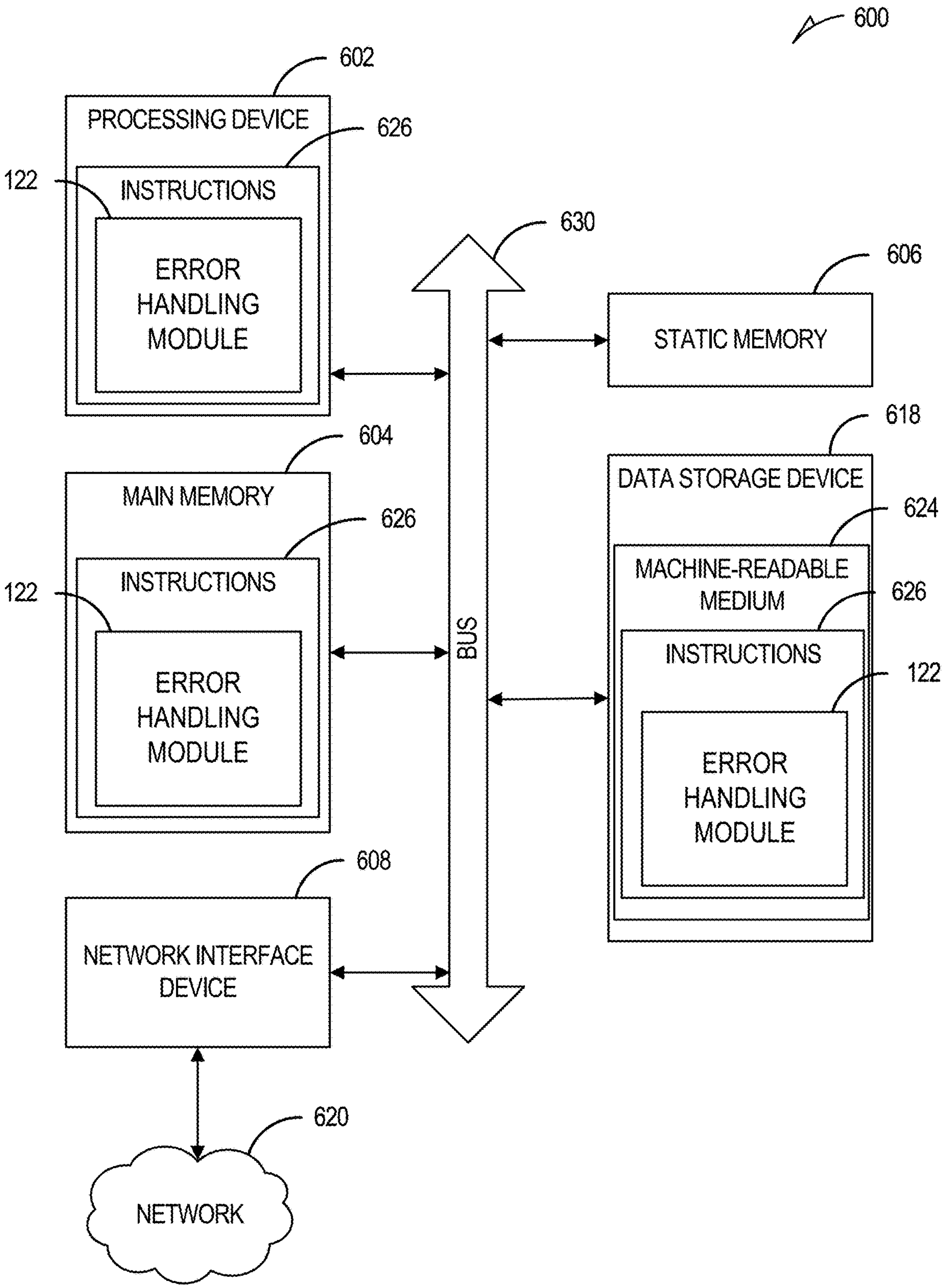
FIG. 6 is a block diagram illustrating a diagrammatic representation of a machine in the form of a computer system within which a set of instructions can be executed for causing the machine to perform any one or more of the methodologies discussed herein, in accordance with some examples.

FIG. 6 illustrates an example machine in the form of a computer system 600 within which a set of instructions can be executed for causing the machine to perform any one or more of the methodologies discussed herein. In some examples, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the panic handling component 122 of FIG. 1). In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a network switch, a network bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one example, the instructions 626 include instructions to implement functionality corresponding to firmware slot manager (e.g., the panic handling component 122 of FIG. 1). While the machine-readable storage medium 624 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system's memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks; read-only memories (ROMs); random access memories (RAMs); erasable programmable read-only memories (EPROMs); EEPROMs; magnetic or optical cards; or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description above. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine-readable (e.g., computer-readable) storage medium such as a read-only memory (ROM), random access memory (RAM), magnetic disk storage media, optical storage media, flash memory components, and so forth.

In the foregoing specification, examples of the disclosure have been described with reference to specific examples thereof. It will be evident that various modifications can be made thereto without departing from the examples of the disclosure as set forth in the following claims. The specification and drawings are, accordingly, to be regarded in an illustrative sense rather than a restrictive sense.

What is claimed is:

1. A system comprising:
- a memory sub-system comprising a set of memory components;
- a processing device, operatively coupled to the set of memory components, and configured to perform operations comprising:
  - detecting failure of the memory sub-system;
  - determining that self-recovery from the failure of the memory sub-system is unavailable;
  - in response to determining that self-recovery from the failure of the memory sub-system is unavailable, incrementally transitioning a state of the memory sub-system to different panic handling modes; and
  - returning the memory sub-system to a deployed mode from one of the different panic handling modes in response to successfully recovering the memory sub-system.

2. The system of claim 1, wherein the memory sub-system is installed in an automotive environment and is associated with at least one of an infotainment system of the automotive environment or advanced driver assistance systems (ADAS) of the automotive environment.

3. The system of claim 1, wherein detecting the failure comprises detecting a critical event representing a critical firmware or hardware failure of the memory sub-system, the critical firmware failure being triggered by a firmware bug, the critical hardware failure being triggered by error correction errors or parity errors.

4. The system of claim 3, wherein the critical event comprises at least one of PCIe link drops, firmware asserts, command timeouts, entering of a write protect state in the memory sub-system, loop of resets, or a threshold number of interrupts being transmitted by the processing device to a host.

5. The system of claim 3, wherein the critical event comprises a panic event corresponding to a critical and non-recoverable error condition encountered by the memory sub-system that adversely impacts data integrity or recoverability.

6. The system of claim 1, wherein the different panic handling modes comprise at least one of a panic mode, a basic functional mode (BFM), a read-only mode, a write protect mode, a write abort host mode, a write protect internal mode, a thermal abort mode, a RAIN failure mode, a crippled mode, or a diagnostic mode.

7. The system of claim 6, wherein the panic mode and the crippled mode each prevents the processing device from executing any nonvolatile memory express (NVMe) commands, wherein the BFM restricts the processing device to executing a limited set of NVMe commands comprising one or more of set features, create/delete I/O submission queue, create/delete I/O completion queue, identify controller, asynchronous event request, get features, get log page, sanitize, and security send and receive commands.

8. The system of claim 6, wherein the read-only mode and write protect mode each abort host writes to disallow write commands to the set of memory components while allowing data to be read from the set of memory components.

9. The system of claim 6, wherein the write abort host mode aborts non-committed write commands, and wherein the write protect internal mode prevents block retirement.

10. The system of claim 6, wherein the diagnostic mode places the memory sub-system in a debugging state for executing one or more debug commands.

11. The system of claim 1, wherein the state of the memory sub-system is placed in a recovery mode, a basic functional mode or cripple mode, the operations comprising:
- generating an SMBus alert on a system management bus (SMBus);
- receiving a request from a host to read an alert response address in response to the host receiving the SMBus alert;
- de-asserting the SMBus alert in response to receiving the request from the host; and
- servicing one or more reads at a particular register.

12. The system of claim 1, the operations comprising:
- determining that self-recovery from the failure of the memory sub-system is available;
- placing the memory sub-system in a write abort mode in response to determining that self-recovery from the failure of the memory sub-system is available;
- saving debugging information comprising at least one of NVMe logs, Failure Analysis Dump/Vendor specific logs, SMART logs, or SMART extended logs; and
- determining whether recovery of the memory sub-system was successful to condition transition to the deployed mode.

13. The system of claim 12, the operations comprising:
- initially placing the memory sub-system in a panic mode of the different panic handling modes;
- saving debugging information in the panic mode;
- resetting the processing device of the memory sub-system; and
- attempting to read user data from the set of memory components.

14. The system of claim 13, the operations comprising:
- determining that the user data is readable from the set of memory components;
- in response to determining that the user data is readable from the set of memory components, transitioning the memory sub-system into a write protect mode from the panic mode;
- performing a recovery action in response to a host read of a designated register; and
- determining whether recovery of the memory sub-system was successful to condition transition to the deployed mode.

15. The system of claim 14, the operations comprising:
- in response to determining that recovery of the memory sub-system was unsuccessful, transitioning the memory sub-system into a diagnostic mode from the write protect mode to enable the host to perform one or more debug operations on the memory sub-system.

16. The system of claim 13, the operations comprising:

determining that the user data is unreadable from the set of memory components;

in response to determining that the user data is unreadable from the set of memory components, determining whether an additional failure of the memory sub-system has been detected; and transitioning the memory sub-system into either a basic functioning mode from the panic mode or a cripple mode based on whether the additional failure of the memory sub-system has been detected.

17. The system of claim 1, the operations comprising:

determining that self-recovery from the failure of the memory sub-system is available;

saving debugging information comprising at least one of NVMe logs, Failure Analysis Dump/Vendor Specific logs, SMART logs, or SMART extended logs;

determining that self-recovery of the memory sub-system was unsuccessful;

in response to determining that self-recovery of the memory sub-system was unsuccessful, determining that the failure of the memory sub-system is of a certain type; and performing different types of error recovery operations based on determining that the failure of the memory sub-system is of the certain type.

18. The system of claim 17, the operations comprising:

transitioning the memory sub-system into a panic mode in response to determining that the failure of the memory sub-system is not of the certain type;

in response to determining that an additional failure of the memory sub-system has not been detected, determining whether the failure is of a non-persistent type;

conditioning transition of the memory sub-system into a basic functional mode based on determining whether the failure is of the non-persistent type; and in response to determining that an additional failure of the memory sub-system has been detected, transitioning the memory sub-system into either a basic functioning mode from the panic mode or a cripple mode.

19. A method comprising:

detecting failure of a memory sub-system;

determining that self-recovery from the failure of the memory sub-system is unavailable;

in response to determining that self-recovery from the failure of the memory sub-system is unavailable, incrementally transitioning a state of the memory sub-system to different panic handling modes; and returning the memory sub-system to a deployed mode from one of the different panic handling modes in response to successfully recovering the memory sub-system.

20. A non-transitory computer-readable storage medium comprising instructions that, when executed by a processing device, cause the processing device to perform operations comprising:

detecting failure of a memory sub-system;

determining that self-recovery from the failure of the memory sub-system is unavailable;

in response to determining that self-recovery from the failure of the memory sub-system is unavailable, incrementally transitioning a state of the memory sub-system to different panic handling modes; and returning the memory sub-system to a deployed mode from one of the different panic handling modes in response to successfully recovering the memory sub-system.

* * * * *